(12) United States Patent
Christ

(10) Patent No.: US 8,092,130 B2
(45) Date of Patent: Jan. 10, 2012

(54) FIXING ELEMENT FOR A FRICTION WELDING JOINT

(75) Inventor: Eberhard Christ, Tambach-Dietharz (DE)

(73) Assignee: Ejot GmbH & Co. KG, Bad Laasphe (DE)

( * ) Notice: Subject to any disclaimer, the term of this patent is extended or adjusted under 35 U.S.C. 154(b) by 0 days.

(21) Appl. No.: 12/440,159

(22) PCT Filed: Sep. 14, 2007

(86) PCT No.: PCT/EP2007/008024
§ 371 (c)(1),
(2), (4) Date: May 20, 2009

(87) PCT Pub. No.: WO2008/034563
PCT Pub. Date: Mar. 27, 2008

(65) Prior Publication Data
US 2009/0263207 A1    Oct. 22, 2009

(30) Foreign Application Priority Data

Sep. 20, 2006  (DE) .......................... 10 2006 044 378

(51) Int. Cl.
*F16B 37/06* (2006.01)
(52) U.S. Cl. ....................................... 411/171; 411/402
(58) Field of Classification Search .................. 411/171, 411/176, 185–189, 386
See application file for complete search history.

(56) References Cited

U.S. PATENT DOCUMENTS

| | | | | |
|---|---|---|---|---|
| 2,707,507 | A * | 5/1955 | Tripp et al. .................. | 411/171 |
| 3,140,738 | A * | 7/1964 | Johnson ....................... | 411/171 |
| 3,245,449 | A * | 4/1966 | Mitchell ...................... | 411/176 |
| 3,435,871 | A * | 4/1969 | Johnson ....................... | 411/171 |
| 4,780,035 | A * | 10/1988 | Shibayama et al. ......... | 411/171 |
| 4,824,304 | A * | 4/1989 | Shibayama et al. ......... | 411/171 |
| 4,850,772 | A * | 7/1989 | Jenkins ........................ | 411/171 |
| 5,018,921 | A * | 5/1991 | Pinney ......................... | 411/393 |
| 6,409,444 | B2 * | 6/2002 | Pamer et al. ................ | 411/180 |
| 6,755,601 | B2 * | 6/2004 | Ohta ............................ | 411/171 |
| 7,645,105 | B2 * | 1/2010 | Hengel et al. ............... | 411/171 |
| 2004/0108359 | A1 | 6/2004 | Hashimoto et al. | |
| 2007/0172335 | A1 * | 7/2007 | Christ ......................... | 411/408 |
| 2007/0251979 | A1 | 11/2007 | Mauer | |

FOREIGN PATENT DOCUMENTS

| | | |
|---|---|---|
| DE | 2 227 384 A1 | 2/1973 |
| DE | 196 20 814 A1 | 11/1997 |
| DE | 201 09 359 U1 | 10/2002 |
| DE | 10 2004 034 497 A1 | 2/2006 |
| DE | 20 2004 014 071 U1 | 2/2006 |
| GB | 1 395 632 A | 5/1975 |

* cited by examiner

*Primary Examiner* — Gary Estremsky
(74) *Attorney, Agent, or Firm* — Birch, Stewart, Kolasch & Birch, LLP

(57) ABSTRACT

The invention relates to a fixing element having a concentric end face forming a frictional surface for friction welding joining to a flat part by rotational force and axial force applied by the fixing element to the part, and having multiple radially oriented ridges on the end face. The ridges are limited in the direction of rotation by a front groove introduced into the friction surface, the ridges rising only slightly over the friction surface in the axial direction and being provided with a scraping surface that pushes the material scraped during the friction welding process into the front groove.

20 Claims, 2 Drawing Sheets

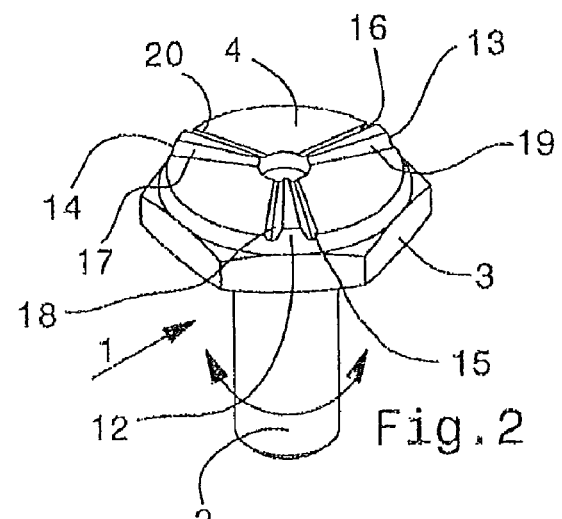
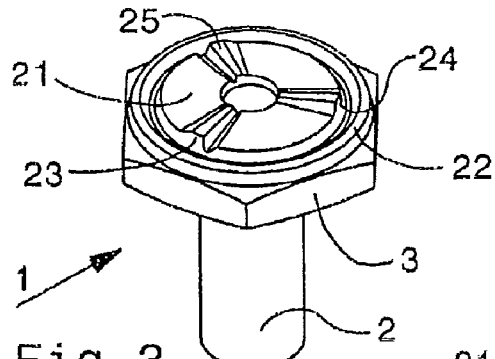
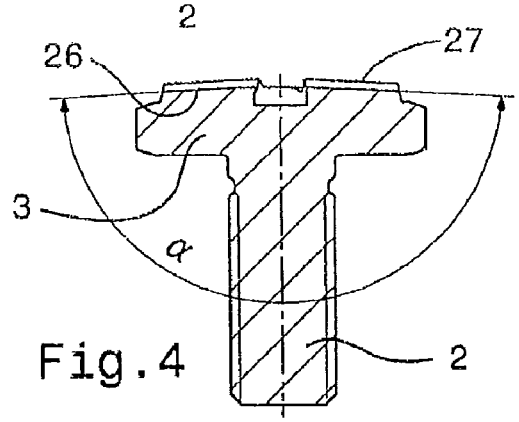
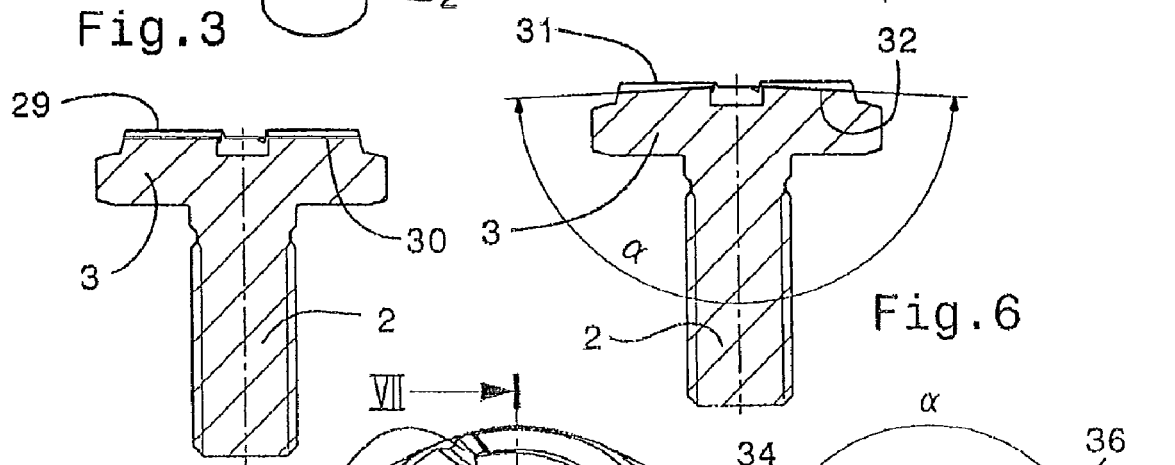
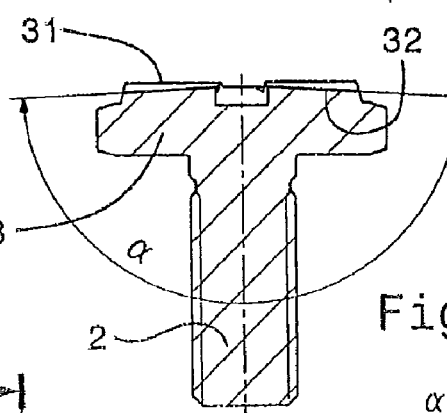
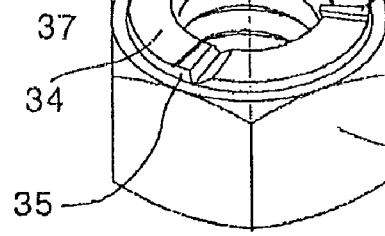
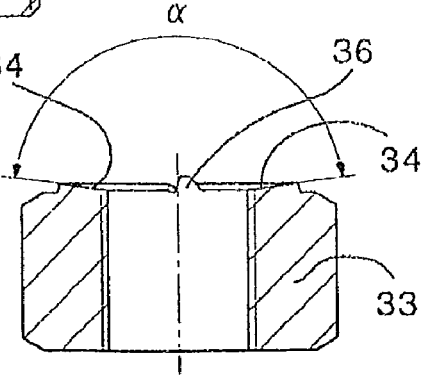

FIXING ELEMENT FOR A FRICTION WELDING JOINT

The invention relates to a fixing element having a concentric end face forming a frictional surface for friction welding joining to a flat part by rotational force and axial force applied by the fixing element to the part, and having multiple radially oriented ridges on the end face.

In a fixing element designed as a light-metal bolt according to DE 201 09 359 U1, the concentric end face of the bolt is already provided with radially oriented ridges for the purpose of friction welding, the ridges acting as star-shaped cutting edges and, due to this design, being able to mechanically cut through an oxide layer formed on a metal sheet so that a secure friction welding joint may be produced between a light-metal bolt and an aluminum sheet. According to this prior art, the ridges, which are designed as milling cutter-like cutting edges, transport the oxide layer present on the sheet, together with material that was plasticized by the friction welding process, outward and away from the joining zone in an annular ridge. The oxide, which represents a contaminant, is therefore mixed with plasticized bolt material and transported outward to the annular ridge, where a bolt material permeated with contaminants lends stability to the bolt welding joint in the form of the annular ridge, while the actual joining zone no longer has any bolt material at its disposal for the bolt welding joint in the area of the bolt end face.

The object of the invention is to design the fixing element described above, which is provided with multiple radially oriented ridges on its end face, in such a way that, on the one hand, contaminants are safely eliminated during friction welding and, on the other hand, however, the plasticized material of the fixing element and of the part fixed thereto is optimally utilized for producing the friction welding joint. According to the invention, this object is achieved by the fact that the ridges are limited by a front groove introduced into the friction surface, the ridges rising only slightly above the friction surface in the axial direction and being provided with a scraping surface that pushes the scraped material into the front groove during the friction welding process.

Forming a front groove in front of each ridge on the end face of the fixing element in such a manner that the front groove is introduced into the friction surface and the ridges rise only slightly above the friction surface in the axial direction causes the scraping surface to first rub away contaminants, in particular oxide, which is pushed by the ridges into the front groove, during friction welding, the ridges, however, being quickly worn away during welding of the bolt, due to their slightly raised height over the friction surface, so that the friction surface of the fixing element very quickly comes into direct contact with the surface of the part, very quickly resulting in frictional action and thus plasticization of the material of both the fixing element and the part, practically all of this material then being also available for forming the friction welding joint over the entire end surface of the fixing element. This results in a particularly secure joint between the fixing element and the part, which may also be particularly quickly produced in an automatic manufacturing process, due to the given dimensions. In designing the friction surface, it is also possible for each of the ridges to be limited on both sides in the direction of rotation by a front groove and a back groove, the residual material of the relevant ridge stripped away by the friction surface being pushed into the back groove by plastic deformation. The provision of a back groove in addition to the front groove opens up the possibility of the back groove accommodating the residual material of the relevant ridge scraped away during friction welding, so that this residual material is not pushed into the friction welding joint, where it could cause problems. The design of the fixing element having a front groove and a back groove on the friction surface also makes it possible to rotate the fixing element in any direction for the purpose of friction welding.

The design of the ridges may be suitably selected as a function of the material of the flat part. If the flat part is a steel part, providing the scraping surface with a sharp edge on either one side or both sides is favorable for removing oxide. The sharp edge on both sides is advantageous, in particular, due to the production engineering of the relevant fixing element. If, however, a relatively soft material, such as aluminum, is used for the flat part, it is sufficient to have a rounded scraping surface that merges with the ridge.

In order to accommodate the abraded material produced by the friction welding process, which also travels outward in the radial direction, a concentrically circumferential annular grove is suitably provided in the outer region of the end face. This annular groove then easily accommodates the material pushed radially in front of the ridges. The annular groove is sealed radially to the outside after the fixing element has been fully welded on, so that the material pushed into the annular groove is securely enclosed and is not able to result in any type of contamination.

The fixing element itself may be designed, in particular, as a bolt; however, it is also possible to use a nut as a fixing element for the purposes of this invention.

The friction surface of the fixing element may be shaped as a flat cone having a cone angle $\alpha=160°$ to $178°$. If a convex cone is used, this has an advantage in that the friction surface initially comes into contact with the part by the tip of its cone during the friction welding process and, by applying a particularly high pressure, the cone flows outward when the two parts to be joined melt and thereby gradually covers the entire friction surface. However, it is also possible to design a concave friction surface as a flat cone. In this case, the outer edge of the friction surface comes into contact first when the fixing element is pressed against the part, the friction surface then entrapping the plasticized material in its interior during the friction welding process and does not allow it to escape to the outside.

Exemplary embodiments of the invention are illustrated in the figures, where:

FIG. 1a shows a perspective view of a fixing element designed as a bolt, including three radial ridges on the friction surface, each having one front groove;

FIG. 1b shows an extract of the illustration in FIG. 1a, which clarifies the design of a ridge from FIG. 1a;

FIG. 2 shows a bolt designed as a fixing element, including three ridges that are enclosed on both sides by a groove, i.e., a front groove and a back groove;

FIG. 3 shows a bolt similar to the one in FIG. 1a, including an additional concentrically circumferential annular groove;

FIG. 4 shows a cross-sectional view along cross-sectional line IV-IV from FIG. 1, a coaxial cone and a cone angle $\alpha=160°$ to $178°$ each being provided for both the friction surface and the scraping surface;

FIG. 5 shows a cross-section similar to the one according to FIG. 4, but having a fixing element in which both the friction surface and the scraping surface have a flat design;

FIG. 6 shows a design similar to the one according to FIG. 4, but having a conical friction surface and a flat scraping surface;

FIG. 7 shows a fixing element designed as a nut;

FIG. 8 shows a cross-sectional view along line VIII-VIII from FIG. 7.

Figures 1A, 1B:
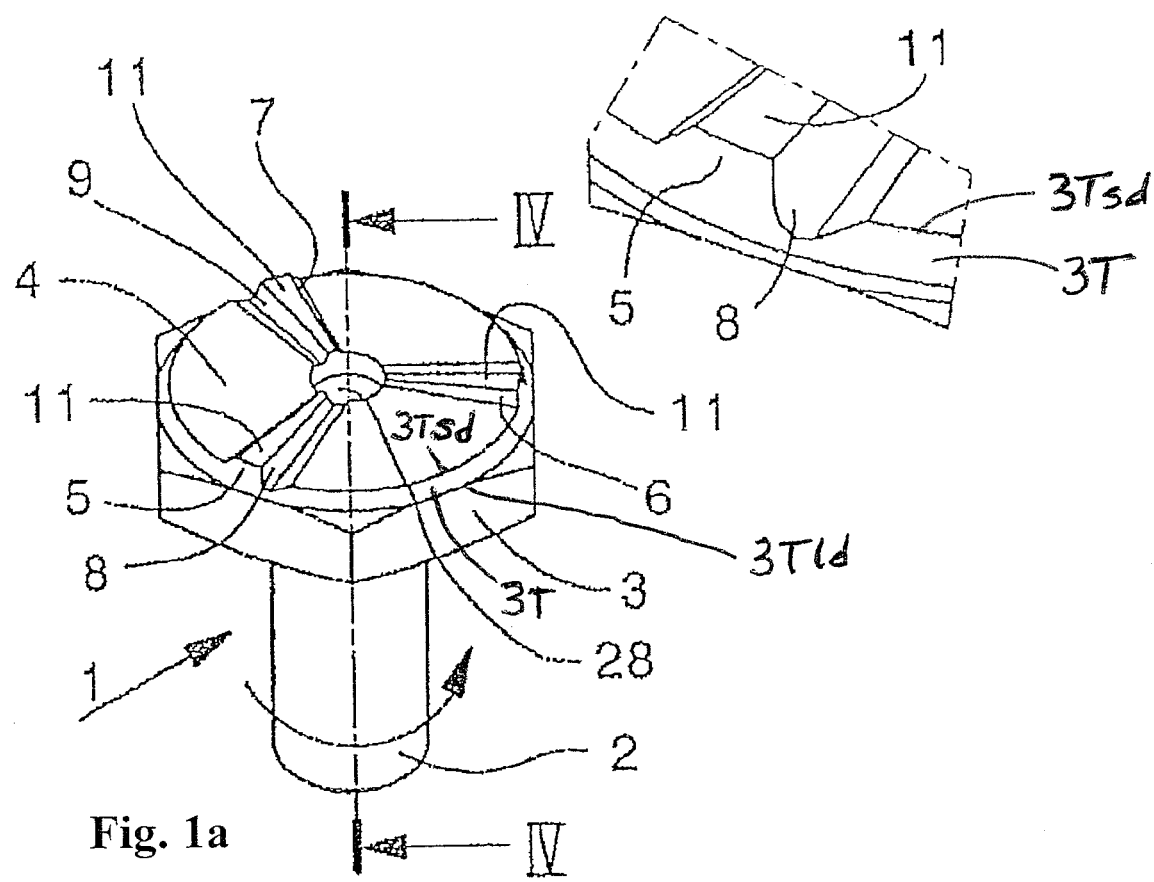

FIG. 1a shows fixing element 1 designed as a bolt, including shank 2 and bolt head 3, which in this case is designed as a hexagon for clamping into a driving element. On the side facing away from shank 2, head 3 has an end face that is designed as friction surface 4. Three ridges 5, 6 and 7 extending outward in the radial direction rise from the friction surface, a front groove 8 and 9 (10 is not visible) being provided in front of each ridge with regard to a direction of rotation according to the sketched rotating arrow, i.e., in the clockwise direction, these grooves limiting ridges 5, 6 and 7 in the direction of rotation. Ridges 5, 6 and 7 rise only slightly above friction surface 4 and each have a scraping surface (see ridge 5 in FIG. 1a) on their side facing away from friction surface 4. Head 3 includes a truncated cone 3T having a small diameter end 3Tsd which forms an outer perimeter of the friction surface 4. The truncated cone 3T has a surface which slopes outwardly and away from the friction surface 4. Head has flat sides which extend in an axial direction away from a large diameter end 3Tld of the truncated cone 3T.

The scraping surface being shown more clearly in FIG. 1b, which is discussed in greater detail below. The raised height of ridges 5, 6 and 7 or that of scraping surfaces 11 limiting them in the axial direction is slightly less than 1.0 mm. Ridges 5, 6 and 7 are advantageously hardened.

Scraping surfaces 11 may lie together on a plane; however, they may also be provided in the form of coaxial cones (which is discussed in greater detailed below in connection with FIGS. 4 and 5), as shown below in connection with FIGS. 4, 5 and 6. Fixing element 1 is pressed against a flat part for the purpose of friction welding and placed in rotary motion, which first causes the surface of the part to be scraped due to the contact between scraping surfaces 11 and the flat part, thereby cleaning this surface for the later actual friction welding process. The material scraped off the surface, e.g., contaminants, oxides or the like, is pushed by ridges 5, 6 and 7 in the direction of rotation and thus reaches adjacent front groove 8, 9 or 10, where this removed material does not interfere with the following friction welding process. By correspondingly rotating and pressing structural member 1 against a part, the surfaces rubbing together are heated in the known manner by friction during friction welding, the materials of the parts being pressed together ultimately softening and thereby completing the friction welding process. The material originating in ridges 5, 6 and 7 is also largely pushed into front groove 8, 9 and 10, so that it is unable to interfere with the friction welding joint.

The fixing element shown in FIG. 1a has in its axial center concentric bore 28, into which ridges 5, 6 and 7 and front groove 8, 9 and 10 run out.

FIG. 1b shows a perspective view of an extract from FIG. 1a, the cross-section of ridge 5 being clearly shown, which is limited axially to the outside by scraping surface 11 and has front groove 8 in front of ridge 5 in the direction of rotation, the front groove being used to accommodate abraded material and residual material of ridge 5.

FIG. 2 shows a modification of the design according to FIG. 1, a fixing element 1 again being shown which is designed as a bolt having a similar design to that in FIG. 1a. However, fixing element 1 in this case has a front groove 15, 16 and 17 as well as a back groove 18, 19 and 20 in addition to three ridges 12, 13 and 14 in friction surface 4, which increases the material accommodation capacity over that of only ridges 12, 13 and 14 and, moreover, also makes it possible to mount fixing element 1 in the clockwise direction as well as the counterclockwise direction. Reference is also hereby made to the explanations regarding FIGS. 1a and 1b.

FIG. 3 again shows a fixing element 1 designed as a bolt, which largely corresponds to the one according to FIG. 1a, but has concentrically circumferential annular groove 22 in the region of its friction surface 21. This annular groove is used to accommodate any material that may be pushed radially by ridges 23, 24 and 25.

FIG. 4 shows a cross-sectional view along line IV-IV from FIG. 1a, which demonstrates that in this case both friction surface 26 and scraping surface 27 are shaped like a coaxial flat cone, namely a cone having an angle of α=175°, it being noted that this angle may lie in a range between 160° and 178°. Both friction surface 26 and scraping surface 27 are inclined by the same angle. As a result, the middle region of the end face of the fixing element comes into contact with a part when fixing element 1 is pressed against the part, which applies to both the scraping surface and subsequently also to the friction surface. When using this specific embodiment, an abrasion and friction welding action occurs in the center of head 3, after which the scraping and friction welding actions extend radially to the outside and over the entire end surface of head 3.

FIG. 5 shows a variant of the illustration according to FIG. 4, in which scraping surface 29 and friction surface 30 are positioned at right angles to the longitudinal axis of part 1. In this specific embodiment, scraping surfaces 29 therefore press against a part over their entire length when brought into contact with the part, after which friction surface 30 follows, which also comes into contact with a part over its entire surface.

FIG. 6 shows a further variant of the illustration according to FIG. 4, in which scraping surface 31 is flat all over, while friction surface 32 is shaped like a flat cone, as illustrated in FIG. 3.

With regard to the fixing elements according to FIGS. 4, 5 and 6, it should be further noted that the bolts illustrated here each are provided with a thread on their shanks 2, this being intended to merely indicate that, after friction welding, the relevant bolts may naturally be provided with a screw connection for the purpose of screwing on any additional part or for other purposes.

FIG. 7 shows a perspective view of a fixing element 33, which is designed as a hexagon nut and has friction surface 34 on its one end face. Like in the design according to FIG. 1a, three ridges 35, 36 and 37 are provided in friction surface 34, these ridges together with the front groove running in front of them accommodating scraped-away or otherwise removed material in the same manner as those according to FIG. 1a.

FIG. 8 shows fixing element 33 in a cross-sectional view along line VIII-VIII, which shows that in this case friction surface 34 is shaped like a concave cone, which causes the outer edge of friction surface 34 to first come into contact with the surface of a part when this fixing element is set in place and thereby causes the friction welding process to progress from the outside to the inside.

The invention claimed is:

1. A fixing element having a substantially circular end face forming a friction surface for friction welding joining to a flat part by rotational force and axial force applied by the fixing element to the part, and having multiple radial ridges,
   wherein the multiple radial ridges are limited in the direction of rotation by a front groove introduced into the friction surface, the multiple radial ridges rising only slightly above the friction surface in an axial direction and each being provided with a scraping surface that pushes scraped material into the front groove during the friction welding process, wherein the scraping surface of each of the multiple radial ridges extends outwardly from a circular concentric bore of the fixing element to a small diameter end of a truncated cone and is provided with a sharp edge on one side, and wherein the friction surface is substantially flat.

2. The fixing element according to claim 1, wherein each of the multiple radial ridges is limited on both sides in the direction of rotation by the front groove and a back groove in the friction surface, whereby residual scraped material of the corresponding ridge abraded by the friction surface can be pushed into the back groove.

3. The fixing element according to claim 2, wherein each of the multiple radial ridges is provided with a sharp edge on both sides.

4. The fixing element according to claim 2, wherein the end face has a concentrically circumferential annular groove in its outer region.

5. The fixing element according to claim 1, wherein a each of the scraping surfaces merges with the corresponding ridge.

6. The fixing element according to claim 1, wherein the end face has a concentrically circumferential annular groove disposed radially outward with respect to the truncated cone.

7. The fixing element according to claim 1, wherein the end face is provided with a concentric bore.

8. The fixing element according to claim 1, wherein the fixing element is designed as a bolt having a head with flat sides extending in the axial direction away from a large diameter end of the truncated cone.

9. The fixing element according to claim 1, wherein the substantially flat friction surface forms a truncated coaxial cone having a cone angle $\alpha=160°$ to $178°$.

10. The fixing element according to claim 9, wherein the truncated cone forms a convex friction surface.

11. The fixing element according to claim 9, wherein the truncated cone forms a concave friction surface.

12. The fixing element according to claim 1, wherein each of the multiple radial ridges is hardened.

13. The fixing element of claim 1, wherein the small diameter end of the truncated cone forms an outer perimeter of the friction surface, the truncated cone having a surface which slopes outwardly and away from the friction surface.

14. A fixing element having a substantially circular end face forming a friction surface for friction welding joining to a flat part by rotational force and axial force applied by the fixing element to the part, and having multiple radial ridges, wherein the ridges are limited in the direction of rotation by a front groove introduced into the friction surface, the ridges rising only slightly above the friction surface in the axial direction and being provided with a scraping surface that pushes scraped material into the front groove during the friction welding process, and further comprising:

a truncated cone having a small diameter end which forms an outer perimeter of the friction surface, the truncated cone having a surface which slopes outwardly and away from the friction surface, wherein the fixing element is designed as a nut the flat sides of which extend in an axial direction away from a large diameter end of the truncated cone.

15. The fixing element according to claim 14, wherein the substantially flat scraping surface forms a truncated coaxial cone having a cone angle $\alpha=160°$ to $178°$.

16. The fixing element according to claim 14, wherein the end face has a concentrically circumferential annular groove in its outer region.

17. A fixing element having a substantially circular end face forming multiple friction surfaces for friction welding joining to a flat part by rotational force and axial force applied by the fixing element to the part, and having multiple radial ridges, wherein each of the multiple radial ridges is limited in the direction of rotation by a front groove introduced into the corresponding friction surface, each of the multiple radial ridges rising only slightly above the corresponding friction surface in the axial direction, and each being provided with a scraping surface that pushes scraped material into the front groove during the friction welding process, and further comprising:

a truncated cone having a small diameter end which forms an outer perimeter of the multiple friction surfaces, the truncated cone having a surface which slopes outwardly and away from the multiple friction surfaces, wherein each of the multiple friction surfaces has a substantially flat design and is substantially pie-shaped, and wherein each of the multiple friction surfaces extends outwardly from a circular concentric bore of the fixing element to the small diameter end of the truncated cone.

18. The fixing element according to claim 17, wherein the end face has a concentrically circumferential annular groove in its outer region.

19. A fixing element having a circular shaped end face in the form of a friction surface for friction welding joining to a flat part by rotational force and axial force applied by the fixing element to the part, and having multiple radial ridges, wherein the circular shaped end face friction surface for welding joining is substantially flat and contains therein the multiple radial ridges which are separated from one another by pie-shaped sections of the substantially flat end face friction surface, and for each of the multiple radial ridges, in the direction of rotation of the fixing element during friction welding, a front groove located in the substantially flat, circular shaped end face, wherein each of the multiple radial ridges rises above the friction surface in an axial direction and is provided with a top scraping surface adapted to push scraped material into the corresponding front groove during the friction welding, wherein each of the top scraping surfaces is substantially pie-shaped and substantially flat, wherein each of the top scraping surfaces extends outwardly from a circular concentric bore of the fixing element to a small diameter end of a truncated cone.

20. The fixing element of claim 19, wherein the circular shaped end face friction surface is an annulus.

* * * * *